Oct. 12, 1926.                                              1,603,016
J. H. BENNETTS
MOLD FOR MOLDING CEMENTITIOUS MATERIALS, SUCH AS CEMENT OR CONCRETE
Filed May 18, 1926                    2 Sheets-Sheet 1
FIG. 1.
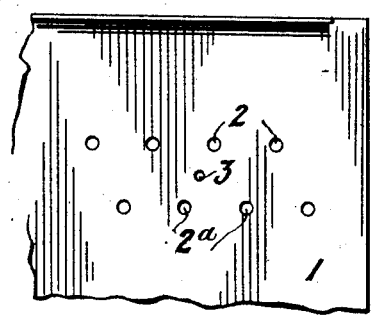
FIG. 4.
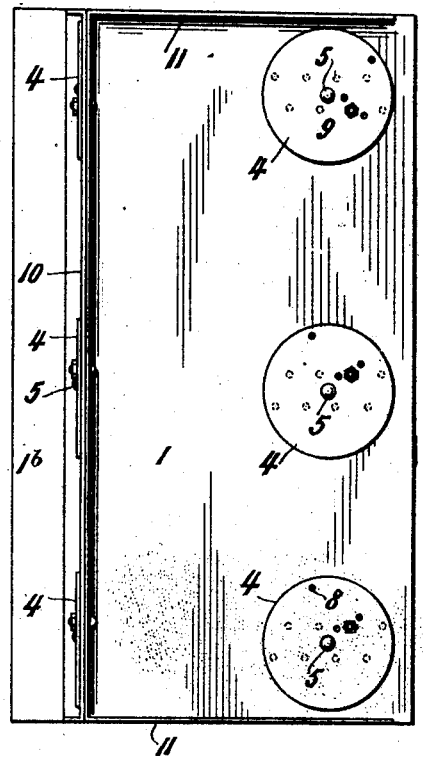
FIG. 2.
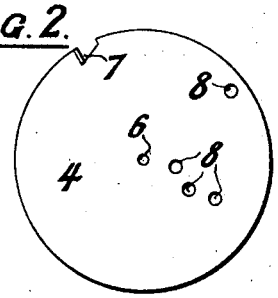
FIG. 3.
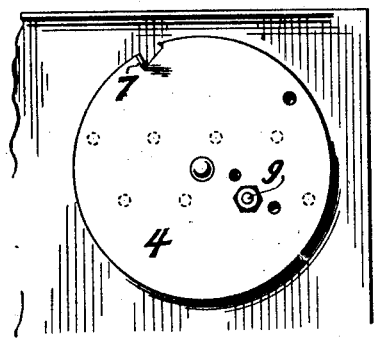
FIG. 5.
FIG. 6.
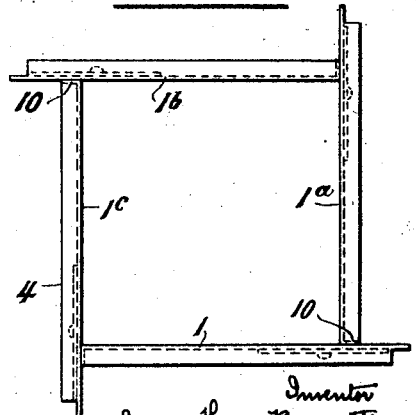
Inventor
James Henry Bennetts Oct. 12, 1926.
J. H. BENNETTS
1,603,016
MOLD FOR MOLDING CEMENTITIOUS MATERIALS, SUCH AS CEMENT OR CONCRETE
Filed May 18, 1926   2 Sheets-Sheet 2
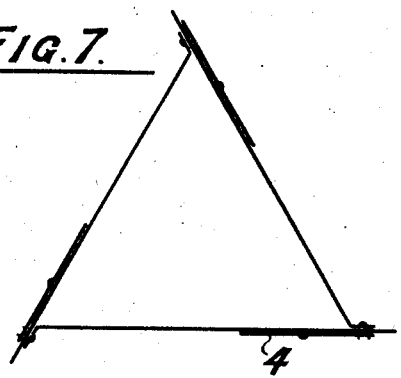
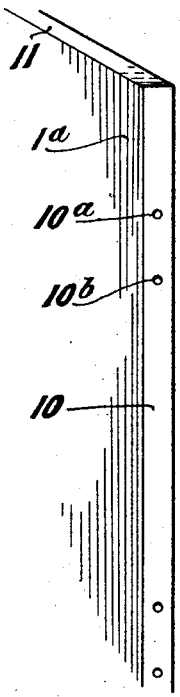
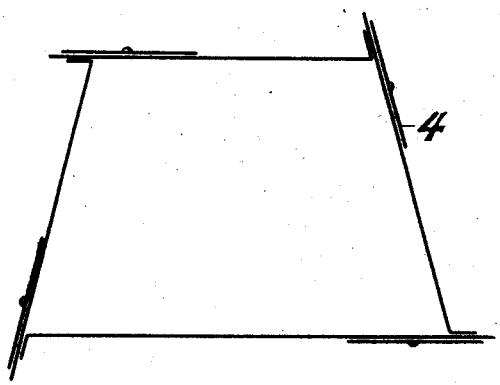
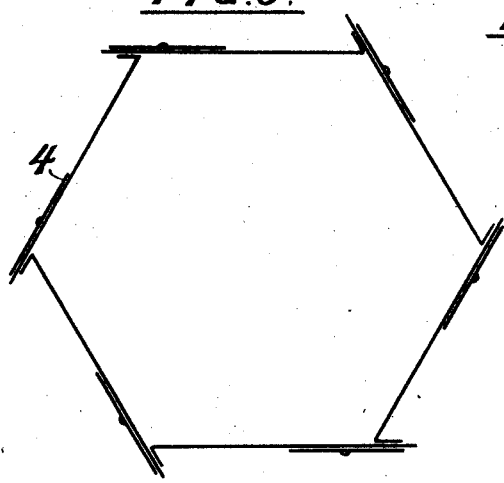
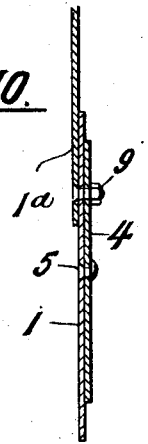

Patented Oct. 12, 1926.

1,603,016

UNITED STATES PATENT OFFICE.

JAMES HENRY BENNETTS, OF FINCHLEY, LONDON, ENGLAND, ASSIGNOR TO SCAFFOLDING (GREAT BRITAIN) LIMITED, OF LONDON, ENGLAND.

MOLD FOR MOLDING CEMENTITIOUS MATERIALS, SUCH AS CEMENT OR CONCRETE.

Application filed May 18, 1926, Serial No. 109,842, and in Great Britain August 27, 1925.

The present invention relates to adjustable built-up molds for molding cementitious materials, such for example as cement or concrete, in a more or less liquid state, the molds being of that kind which are built-up of a plurality of plates connected together in such manner that the dimensions of the molds formed thereby can be varied to a required extent during the building up of same, and to this end the plates composing such molds have been formed with a plurality of bolt holes, certain of which are selected for the passage of connecting bolts in accordance with the dimensions of the mold required to be constructed.

The utilization however of such means for building up adjustable molds presents disadvantages in that those bolt holes through the plates are left open which are not, at the time, being occupied by the passage of the connecting bolts, and since the cement or concrete to be contained in such molds is in a more or less liquid state, such open bolt holes form passages by which some of the cementitious material can escape from the interior of the mold.

Now the object of the present invention is the construction of an adjustable mold which, when erected, is wholly closed in whatever relative positions the plates may have been connected together to produce the size of mold required, alternative bolt holes in the plates not at the time utilized being mechanically closed.

Molds constructed according to the present invention and as hereafter described and claimed, although applicable for general use, are particularly applicable for encasing girders, stanchions or other members of buildings and other structures, generally in situ, with concrete or cementitious material, in which connection it is desirable that the plates composing the mold shall be similar to each other in formation.

The invention will now be described with reference to the accompanying drawings, whereon Fig. 1 is an elevation of a portion of a mold plate, showing a series of bolt holes and a pivot hole adjacent the plain edge of the plate, Fig. 2 shows in elevation, a cover plate detached, and Fig. 3 is an elevation similar to Fig. 1, showing the cover plate in position.

Fig. 4 is an elevation, and Fig. 5 a plan view, showing the invention applied to the construction of a rectangular mold for encasing a girder, pillar or the like; and Fig. 6 is a horizontal section of one corner of the mold shown at Fig. 5, drawn to a larger scale, in order to show more clearly the application of the cover plate. Fig. 6$^A$ is a perspective view showing a portion of a mold plate to illustrate certain bolt holes.

Figs. 7, 8 and 9 show in diagram horizontal section, three molds, differing in shape, constructed according to this invention.

Fig. 10 shows an instance where the invention is utilized for connecting two mold plates together in practically the same plane.

The invention will be firstly described with reference to molds for encasing girders, stanchions and other members of buildings with concrete, to which use the invention is particularly applicable, and the construction shown in the drawings, Figs. 1 to 6$^A$, will be firstly described.

The mold now to be described is of rectangular shape when built-up, as shown at Figs. 4 and 5, and in this case all the four mold plates 1, 1$^a$, 1$^b$, 1$^c$ are similar to each other. Each of these mold plates is flanged outwardly on one side at 10 and is also flanged outwardly at 11 at the top and bottom edges, so that one such rectangular mold can be placed on the top of a similar rectangular mold and the two bolted together by the flanges 11.

Adjacent the plain or unflanged edge of each mold plate, such as 1, a series of bolt holes is formed through the plate, the series consisting, as at Fig. 1, of an upper row of holes 2 at a requisite distance apart extending in a horizontal direction at right angles to the plain vertical edge of the plate 1, and a second lower row of holes 2$^a$ alternating in position with the first row 2. There may be several of such series of holes according to the height of the mold plate, as indicated for instance at Fig. 4 where three series are shown.

Also formed through the plate 1, as indicated at Fig. 1, is a pivot hole 3, and externally over the mold plate 1, see Figs. 3 and 6, is located a cover plate 4, shown detached at Fig. 2, which cover plate is conveniently in the form of a disc and is pivoted centrally upon a pivot pin 5 which passes through the pivot hole 6, Fig. 2, of the cover plate and through the pivot hole 3, Fig. 1, of the mold plate 1. The pivot pin 5 is preferably in the form of a countersunk rivet, the countersunk head of which is on the interior of the mold plate 1, and the cover plate 4 is held on to the rivet by the external head indicated in the drawings, so that the cover plate can be revolved about the pivot. Incidentally the cover plate 4 may be notched, as shown at Fig. 2 and Fig. 3, and the notched portion may be turned up to constitute an ear 7 to facilitate turning the cover plate about its pivot pin 5. Such a cover plate is applied over each series of holes through the mold plate.

Through the cover plate 4, bolt holes 8 are formed, so positioned relatively to the pivotal centre of the cover plate 4 that the cover plate when turned about its pivot pin 5, Fig. 3, will be caused to uncover only one of the bolt holes 2, 2ª through the mold plate 1 at any one time, so that the cover plate 4 forms a kind of hit and miss valve by which any one of the bolt holes 2, 2ª of a series through a mold plate 1, and not more than one, can be uncovered at any one time.

In the example of construction shown in the drawings, Figs. 1 and 2, four bolt holes 8 are formed through the cover plate 4 in different positions relatively to the turning centre 6, so that when this cover plate 4 is applied to the mold plate 1 as at Fig. 3, it will be found, as indicated in the drawing, that when one of the bolt holes 8 of the cover plate is opposite one of the bolt holes 2, 2ª, all the other bolt holes 2, 2ª in the mold plate 1 will be covered.

The adjacent mold plate 1ª, Fig. 5, to which the mold plate 1 is to be bolted, has formed in its flange 10, shown at Fig. 6^A, corresponding series consisting of two holes to each series, the upper hole 10ª corresponding in height with the row of holes 2, Fig. 1, while the lower hole in the same series 10^b corresponds in height to the row of holes 2ª, Fig. 1.

When such plates are to be built-up to form a rectangular mold as shown at Figs. 4 and 5, the cover plate 4 of each series of holes in the mold plate is turned about its axis until the particular bolt hole 2 or 2ª of each series is opposite one of the bolt holes in the cover plate, the particular bolt hole 2 or 2ª being selected for being uncovered according to the size of the mold to be built-up. The mold plate 1 is then applied to the flange 10 of the mold plate 1ª and then a bolt 9, see particularly Figs. 3 and 6, is passed through the hole in the flange 10 of the plate 1ª, through the uncovered hole in the mold plate 1, and through the coinciding bolt hole in the cover plate, and a nut may be applied as shown.

The size of the mold so built-up will therefore depend upon the position in which the cover plates 4 are placed.

It will therefore be evident that each hole 8 of each cover plate 4 may be marked with figures representing two dimensions, so that when a cover plate 4 has been turned about its centre 6 so as to bring one of the holes 8 therein to uncover one of the bolt holes 2 or 2ª in the mold plate, the dimensions of the mold formed when the plates are bolted together, will correspond or have relation to one of the dimensions marked adjacent that particular hole in each cover plate according as to whether the said hole is upon one side or the other of the turning centre of the cover plate.

Where the size of the mold formed, as at Fig. 5, is less than the maximum size capable of being produced by such plates, each plate 1, 1ª, 1^b, 1^c projects for a distance outwardly beyond the flanged edge of the plate with which it contacts.

Each plate, as shown in the example at Fig. 4, is fitted with three cover plates 4 co-acting with three series of bolt holes, although any number of cover plates with corresponding series of bolt holes may be employed.

The molds can be built up, in the manner described, of other than rectangular form, as is illustrated at Figs. 7 to 9, further description of which is unnecessary.

At Fig. 10, two mold plates 1, 1ª are shown, connected together according to this invention, the cover plate 4 being applied to the mold plate 1 as will now be well understood, this only differing from the examples described at Figs. 1 to 6^A in that the plate 1ª is not flanged.

In the mold plate immediately beneath the cover plate 4, as shown at Fig. 3 for example, two rows of bolt holes 2, 2ª have been described as being formed through the mold plate, and such is a convenient construction, although obviously one row of bolt holes, such as 2, in the mold plate 1 might be formed instead of two rows of holes, and the holes in the cover plate 4 suitably arranged so that only one of the holes 2 would be uncovered by the cover plate at any one time.

What I claim as my invention and desire to secure by Letters Patent is:—

1. In adjustable built-up molds for cementitious materials, composed of a plurality of mold plates detachably connected together; a first mold plate having a series of bolt holes adjacent to but at varying distances from one edge thereof and having an additional hole adjacent said series of holes, a cover plate located externally upon and in surface contact with said mold plate to cover said series of holes therein, said cover plate having a hole about centrally therethrough, a pivot pin passing through said central hole of said cover plate and through said additional hole of said mold plate to permit said cover plate to be angularly adjusted about said pivot pin, said cover plate having bolt holes formed therethrough so positioned that when said cover plate is adjusted about said pivot pin only one bolt hole of said cover plate will coincide with one bolt hole of the series in said mold plate at any one time, a second mold plate to be connected to said first mold plate, said second mold plate having a bolt hole formed adjacent one edge thereof, said second mold plate being located in surface contact with the inner face of said first mold plate and with the bolt hole of said second mold plate coinciding with the uncovered bolt hole of said first mold plate, and a bolt passing through said cover plate and through the coinciding holes of said first and second mold plates to secure said mold plates together.

2. In adjustable built-up molds for cementitious materials, composed of a plurality of mold plates detachably connected together; a first mold plate having a series of bolt holes consisting of a plurality of rows of bolt holes at a requisite distance apart and extending from adjacent one edge of said first mold plate and having an additional hole adjacent said series of holes, a cover plate located externally upon and in surface contact with said mold plate to cover said series of holes therein, said cover plate having a hole about centrally therethrough, a pivot pin passing through said central hole of said cover plate and through said additional hole of said mold plate to permit said cover plate to be angularly adjusted about said pivot pin, said cover plate having bolt holes formed therethrough so positioned that when said cover plate is adjusted about said pivot pin only one bolt hole of said cover plate will coincide with one bolt hole of said series of holes in said mold plate at any one time, a second mold plate to be connected to said first mold plate, said second mold plate having bolt holes adjacent one edge thereof arranged parallel to said edge and at requisite distances apart, said second mold plate being located in surface contact with the inner face of said first mold plate and with one of the bolt holes of said second mold plate coinciding with the uncovered bolt hole of said first mold plate, and a bolt passing through said cover plate and through the coinciding holes of said first and second mold plates to secure said mold plates together.

3. In adjustable built-up molds for cementitious materials, composed of a plurality of mold plates detachably connected together; a first mold plate having a plurality of series of bolt holes at distances apart and each series adjacent one edge thereof, said bolt holes of each series being at varying distances from the edge of said first mold plate and having an additional hole adjacent each series of said bolt holes, a plurality of cover plates one located externally upon and in surface contact with said mold plate to cover each series of holes therein, said cover plates each having a hole centrally therethrough, a pivot pin passing through said central hole of each cover plate and through each additional hole of said mold plate, each of said cover plates having bolt holes formed therethrough so positioned that when said cover plate is adjusted about said pivot pin only one bolt hole of each cover plate will coincide with one bolt hole of each series in said mold plate at any one time, a second mold plate to be connected to said first mold plate and located in surface contact with the inner face of the latter, said second mold plate having bolt holes formed therethrough adjacent to and parallel with one edge thereof, and bolts passing through said cover plates and through the coinciding holes of said first and second mold plates to secure said mold plates together.

4. In adjustable built-up molds to temporarily surround girders, stanchions and other members of buildings and other structures for encasing same with cementitious material; a plurality of similar mold plates each having outwardly extending flanges at one vertical edge and at its upper and lower edges and each having a plurality of series of bolt holes distanced apart, each series of bolt holes being located adjacent to and at varying distances from the unflanged edge thereof and having an additional hole adjacent each of said series of bolt holes, cover plates for each mold plate located externally in contact with said mold plate one to cover each said series of holes therein, each of said cover plates having a hole about centrally therein, a pivot pin passing through said central hole of said cover plate and through said additional hole of said mold plate, each of said cover plates having bolt holes formed therethrough so positioned that when said cover plate is adjusted about said pivot pin only one bolt hole of each cover plate will coincide with one bolt hole of each series at any one time, the said flange at the vertical edge of a second mold plate being located in contact with the inner face of the first mold plate, the said second mold plate having bolt holes formed through said flange, said second mold plate being located with the said bolt holes therein coinciding with the uncovered holes of said first mold plate, and a bolt passing through each of said cover plates and through the coinciding holes of said first and second mold plates to secure said mold plates together.

In witness whereof I have hereunto set my hand.

JAMES HENRY BENNETTS.